US008624810B2

(12) United States Patent
Ahn et al.

(10) Patent No.: US 8,624,810 B2
(45) Date of Patent: Jan. 7, 2014

(54) LIQUID CRYSTAL DISPLAY TO WHICH INFRARED RAYS SOURCE IS APPLIED AND MULTI-TOUCH SYSTEM USING THE SAME

(75) Inventors: In-Ho Ahn, Ansan (KR); Dae-San Lim, Anyang (KR); Jong-Seong Choi, Anyang (KR); Hyung-Uk Jang, Goyang (KR); Sang-Rae Lee, Gyeonglu (KR); Sang-Hyuck Bae, Seoul (KR); Byung-Chun Yu, Paju (KR)

(73) Assignee: LG Display Co., Ltd., Seoul (KR)

( * ) Notice: Subject to any disclaimer, the term of this patent is extended or adjusted under 35 U.S.C. 154(b) by 909 days.

(21) Appl. No.: 12/343,131

(22) Filed: Dec. 23, 2008

(65) Prior Publication Data
US 2009/0167656 A1 Jul. 2, 2009

(30) Foreign Application Priority Data

Dec. 31, 2007 (KR) .......................... 10-2007-0141967

(51) Int. Cl.
G09G 3/36 (2006.01)
(52) U.S. Cl.
USPC ............................................ 345/87; 345/173
(58) Field of Classification Search
None
See application file for complete search history.

(56) References Cited

U.S. PATENT DOCUMENTS

| 6,323,892 | B1 * | 11/2001 | Mihara ...................... 348/14.01 |
| 2007/0165007 | A1 * | 7/2007 | Morrison et al. ............. 345/175 |
| 2007/0290966 | A1 * | 12/2007 | Lee et al. ......................... 345/87 |
| 2008/0111780 | A1 * | 5/2008 | Abileah et al. .................. 345/87 |
| 2008/0129707 | A1 * | 6/2008 | Pryor ............................ 345/175 |
| 2008/0158172 | A1 * | 7/2008 | Hotelling et al. ............. 345/173 |
| 2008/0259042 | A1 * | 10/2008 | Thorn ........................... 345/173 |
| 2008/0284925 | A1 * | 11/2008 | Han ............................... 349/12 |
| 2008/0297487 | A1 * | 12/2008 | Hotelling et al. ............. 345/173 |
| 2009/0295760 | A1 * | 12/2009 | Linge et al. .................... 345/179 |

FOREIGN PATENT DOCUMENTS

| CN | 101153972 A | 4/2008 |
| JP | 2005-295399 A | 10/2005 |
| KR | 10-2002-0047534 A | 6/2002 |
| KR | 10-2005-0002566 A | 1/2005 |

* cited by examiner

*Primary Examiner* — Adam R Giesy
*Assistant Examiner* — Henok Heyi
(74) *Attorney, Agent, or Firm* — Birch, Stewart, Kolasch & Birch, LLP (57) ABSTRACT

There are provided a liquid crystal display (LCD) to which infrared rays (IR) light sources are applied and a multi-touch system using the same. The LCD to which IR light sources are applied includes a back light in which a plurality of lamp light sources and a plurality of IR light sources are repeatedly arranged in column and row directions, a diffusion plate and a plurality of optical sheets arranged on the back light, and an LCD panel provided on the back light to display an image using light incident from the back light.

5 Claims, 6 Drawing Sheets

FIG. 1

BACKGROUND ART

FIG. 2

BACKGROUND ART

FIG. 3

BACKGROUND ART

FIG. 4

BACKGROUND ART

FIG. 5

BACKGROUND ART

LIQUID CRYSTAL DISPLAY TO WHICH INFRARED RAYS SOURCE IS APPLIED AND MULTI-TOUCH SYSTEM USING THE SAME

This nonprovisional application claims priority under 35 U.S.C. §119(a) on Patent Application No. 10-2007-0141967 filed in Republic of Korea on Dec. 31, 2007, the entire contents of which are hereby incorporated by reference.

BACKGROUND OF THE INVENTION

1. Field of the Invention

The present invention relates to a liquid crystal display (LCD) including a back light unit, and more particularly, to a liquid crystal display (LCD) in which an infrared rays (IR) source is used as a back light unit and a multi-touch system using the same.

2. Description of the Background Art

Recently, as development is rapidly made to an information-oriented society, flat panel displays (FPD) having excellent characteristics that are made thin and light and that consume a small amount of power are required. Among the FPDs, liquid crystal displays (LCD) have high resolution, picture quality, and color display characteristics so that the LCDs are actively applied to the monitors of notebooks or desktops.

In general, in an LCD, two substrates in which electric field generating electrodes are formed, respectively, are provided so that the surfaces on which the two electrodes are formed face each other, liquid crystal is implanted between the two substrates, and a voltage is applied to the two electrodes so that liquid crystal molecules are moved by a generated electric field to display an image by the transmittance of light that varies with the movement of the liquid crystal molecules.

Since a common LCD does not emit light by itself but controls the transmittance of light, an additional light source is required.

Therefore, a back light is provided on the rear surface of an LCD panel and the light emitted from the back light is incident on the LCD panel to control the amount of light in accordance with the arrangement of liquid crystal and to display an image.

The back light is divided into a direct light type back light provided under the LCD panel to directly illuminate the entire surfaces of the substrates and a side light type back light provided on one side or on both sides of the LCD panel to reflect light by a light guide plate and a reflection plate to diffuse the reflected light.

Here, in the direct light type back light, since the light emitted from a lamp is emitted to the front of the LCD panel, the light guide plate is not required and a plurality of lamps can be used. Therefore, since the light use efficiency of the direct light type back light is high, the direct light type back light can be easily managed, and the size of a display surface is not limited, the direct light type back light is used for a large screen LCD.

A cold cathode fluorescent lamp (CCFL) in which the light emitted from a cold cathode fluorescent tube is reflected by the reflection plate and a milk-white scatter plate is provided on the reflection channel of the light so that the light locally having uniform illumination illuminates the LCD has been used for the LCD.

However, since the thickness of such a back light cannot be made small so that the LCD becomes complicated and enlarged, recently, a technology, in which a light emitting diode (LED) that consumes a small amount of power and that has high response speed and a semi-permanent life is used as a bipolar electrode device that emits light only when current flows for a surface light source so that the back light is made thin and brightness is improved, is suggested.

Figure 1:
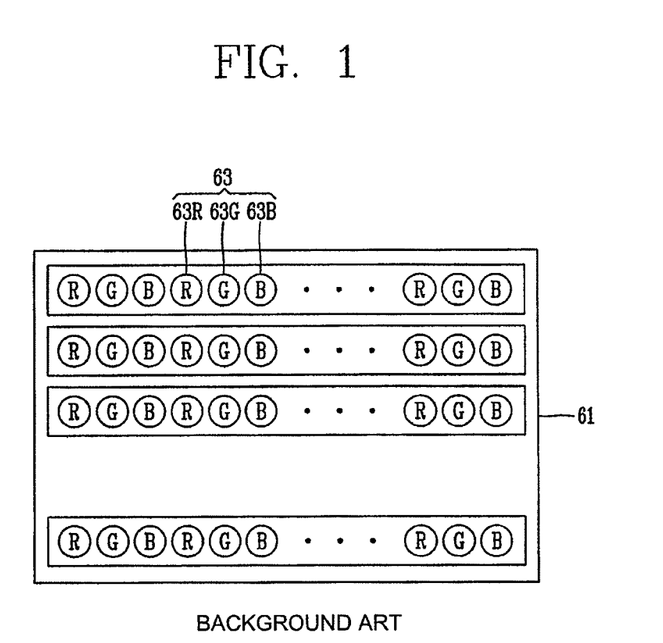
FIG. 1 is a plan view of a conventional back light unit consisting of a plurality of R, G, and B LEDs.
Figure 2:
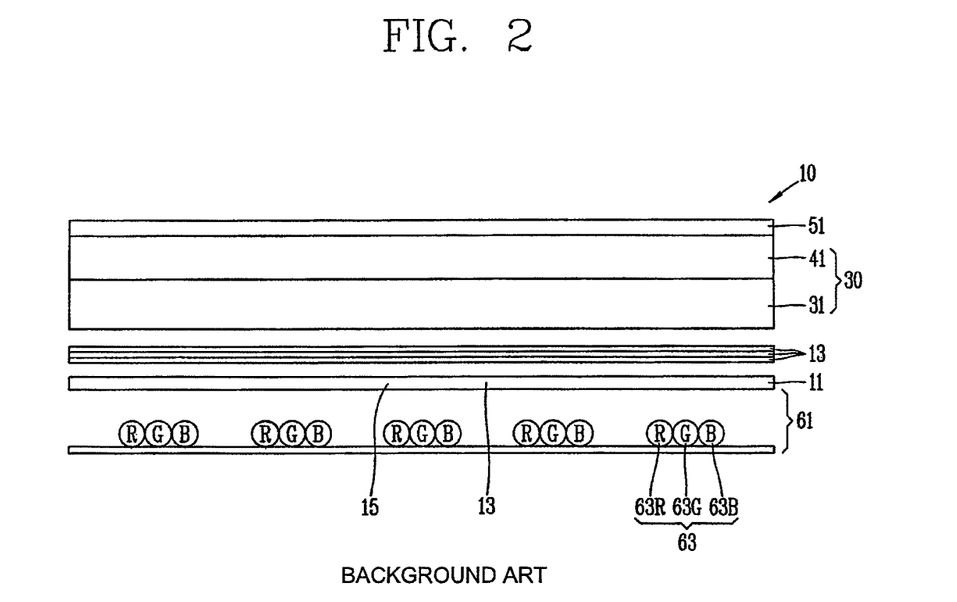
FIG. 2 is a schematic sectional view of a liquid crystal display (LCD) including the conventional back light unit consisting of the plurality of R, G, and B LEDs.

The conventional back light unit using the LED light source and the LCD to which the back light unit is applied will be schematically described as follow with reference to FIGS. 1 and 2.

FIG. 1 is a plan view of a conventional back light unit consisting of a plurality of R, G, and B LEDs.

FIG. 2 is a schematic sectional view of an LCD including the conventional back light unit consisting of the plurality of R, G, and B LEDs.

As illustrated in FIG. 1, a conventional back light unit 61 includes LED light sources 63 each consisting of a plurality of red (R), green (G), and blue (B) LEDs 63R, 63G, and 63B, which are repeatedly arranged under the back light unit 61 in column and row directions.

The LCD to which the back light unit having such a structure is applied will be described as follows with reference to FIG. 2.

As illustrated in FIG. 2, the LCD to which the conventional back light unit is applied includes the back light unit 61 in which the LED light sources 63 each consisting of the plurality of red (R), green (G), and blue (B) LEDs 63R, 63G, and 63B are arranged and a diffusion sheet 11, a prism sheet 13, and an LCD panel 30 provided on the back light unit 61 to secure a desired view angle.

Here, a reflection plate (not shown) for preventing light from leaking is provided under the LED light source 63.

In addition, the LCD panel 30 includes a lower array substrate 311 on which a switching device for driving the LCD panel is formed, a color filter array substrate 41 on which an image is displayed by driving the switching device, and a liquid crystal layer (not shown) provided between the lower array substrate 31 and the color filter array substrate 41 to control the transmittance of light while moving in a certain direction in accordance with an electric field direction.

On the other hand, a touch panel 51 is attached onto the LCD panel 30 so that a display to which the touch panel 51 is applied is realized.

On the other hand, according to another embodiment of the conventional art, a multi-touch system using the LCD to which the touch panel is applied will be described as follows with reference to FIGS. 3 to 5.

Figure 3:
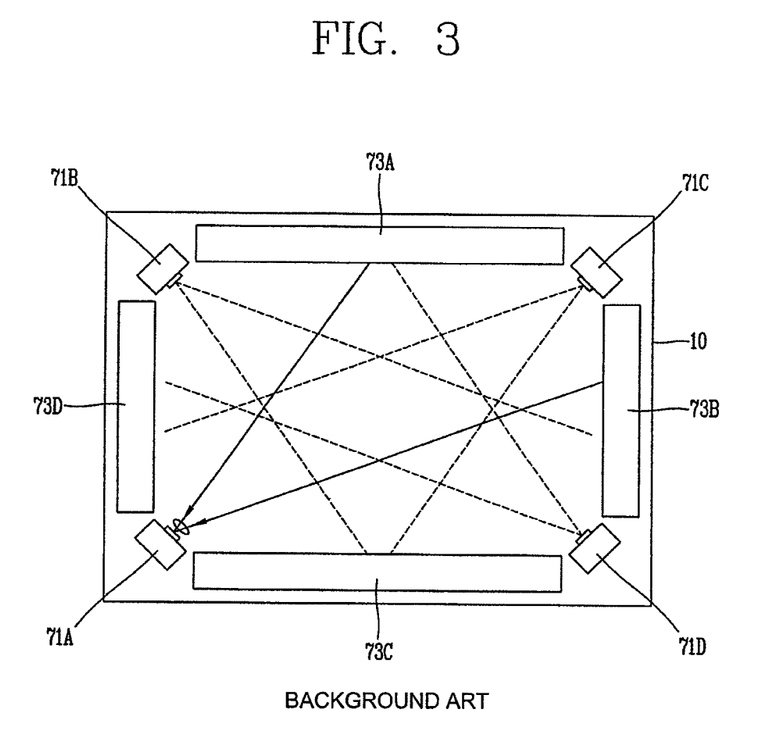
FIG. 3 is a schematic view illustrating a conventional multi-touch system in which infrared (IR) rays LED modules and cameras are arranged.

FIG. 3 is a schematic view illustrating the conventional multi-touch system in which infrared (IR) rays LED modules and cameras are arranged.

Figure 4:
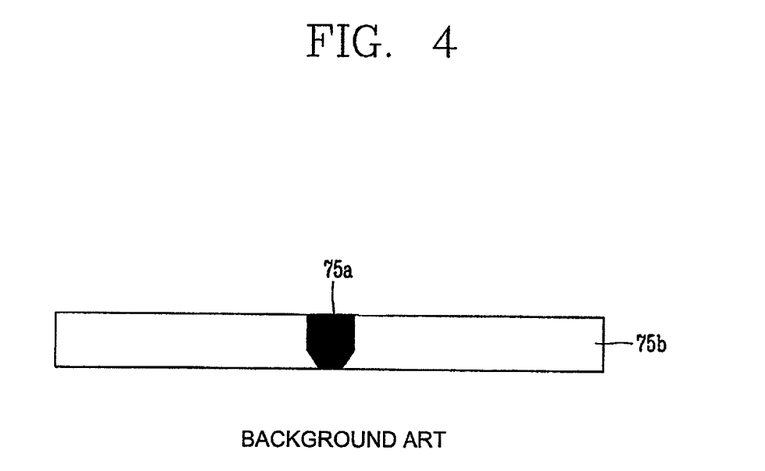
FIG. 4 is a schematic view illustrating the touch sense image seen from a first camera when the multi-touch system of FIG. 3 operates.

FIG. 4 is a schematic view illustrating the touch sense image seen from a first camera when the multi-touch system of FIG. 3 operates.

Figure 5:
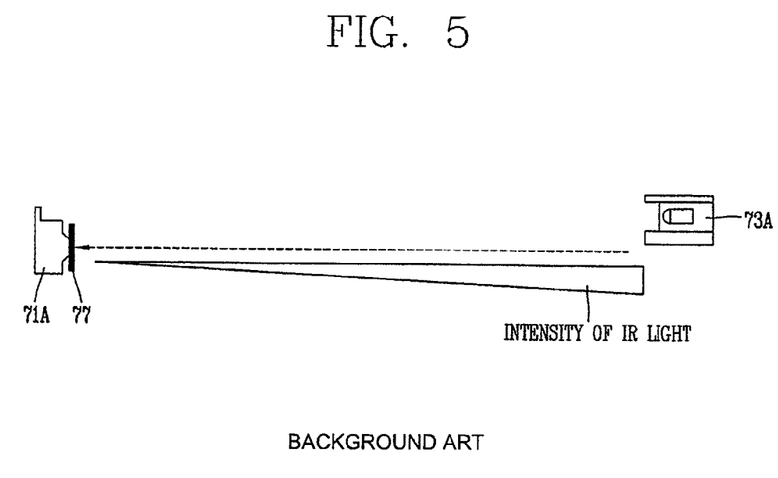
FIG. 5 is a schematic view illustrating the intensity of an IR light source when the IR light source on the side of the conventional multi-touch system is applied.

FIG. 5 is a schematic view illustrating the intensity of an IR light source when the IR light source on the side of the conventional multi-touch system is applied.

As illustrated in FIG. 3, the conventional multi-touch system includes the LCD to which the touch panel 51 is attached, the plurality of first to fourth cameras 71A, 71B, 71C, and 71D provided at the edges, the first to fourth IR light source modules 73A, 73B, 73C, and 73D provided between the two adjacent cameras.

As illustrated in FIG. 4, in the conventional multi-touch system having the above structure, the IR LED modules operate as the back light so that the first to fourth cameras 71A, 71B, 71C, and 71D sense a touch object 75a in a dark environment.

At this time, for the first camera 71A to sense touch, among the first to fourth IR LED modules 73A, 73B, 73C, and 73D, only the first and second IR LED modules 73A and 73B are to be turned on and the third and fourth IR LED modules 73C and 73D are to be turned off.

In the above structure, when the first camera 71 senses the touch object 75a, as illustrated in FIG. 5, since the first and second IR LED modules 73A and 73B operate to the first camera 71A as the back light, the first camera 71A displays the touch object 75a where IR reflection is generated to be black and displays the remaining part 75b directly incident on the first camera 71A without reflecting IR to be white to sense the touch object 75a.

The conventional LCD and the multi-touch system to which the conventional LCD is applied have the following problems.

As illustrated in FIG. 5, in the conventional LCD and the multi-touch system to which the conventional LCD is applied, the first camera 71A and the first IR light source 73A are all positioned on the sides so that the directional vector components of the first camera 71A and the first IR light source 73A are not the same horizontal line but are close to similar horizontal lines through the control of the positions of the first camera 71A and the first IR light source 73A.

Due to such a structural defect, the light of the IR light source positioned on the side is directly incident on the camera on the side or is reflected and incident, which severely deteriorates the operation of the touch system.

Therefore, the image of the camera can be distorted by an extremely small error to cause an erroneous operation. In addition, when a product is actually manufactured, it is difficult to correctly set the product.

Furthermore, like in the conventional art, in the technology of providing the IR light source on the side, as illustrated in FIG. 5, the intensity of IR light is reduced away from the IR light source module 73A. Therefore, the intensity of the reflected light of the touch object is not uniform so that the efficiency of the system deteriorates.

SUMMARY OF THE INVENTION

In order to solve the above problems, it is an object of the present invention to provide a liquid crystal display (LCD) to which an infrared (IR) light source is applied, in which the IR light source is added to the back light of the LCD to increase the intensity of the IR light of the LCD and to increase the utilization region of the LCD and a multi-touch system using the same.

In order to achieve the above object, there is provided a liquid crystal display (LCD) to which infrared rays (IR) light sources are applied, comprising a back light in which a plurality of lamp light sources and a plurality of IR light sources are repeatedly arranged in column and row directions, a diffusion plate and a plurality of optical sheets arranged on the back light, and an LCD panel provided on the back light to display an image using light incident from the back light.

In order to achieve the above object, there is provided a multi-touch system to which an LCD is applied, comprising the LCD including a back light in which a plurality of lamp light sources and a plurality of IR light sources are repeatedly arranged in column and row directions, an LCD panel provided on the back light to display an image using light incident from the back light, and a touch panel attached onto the LCD panel and a plurality of cameras that are provided on the LCD at edges and in which IR light incident from the IR light sources provided in the LCD is reflected by a touch object and the reflected IR light is incident to create a touch sense image.

DETAILED DESCRIPTION OF PREFERRED EMBODIMENTS

A liquid crystal display (LCD) to which an infrared rays (IR) light source according to preferred embodiments of the present invention will be described in detail with reference to the attached drawings.

Figure 6:
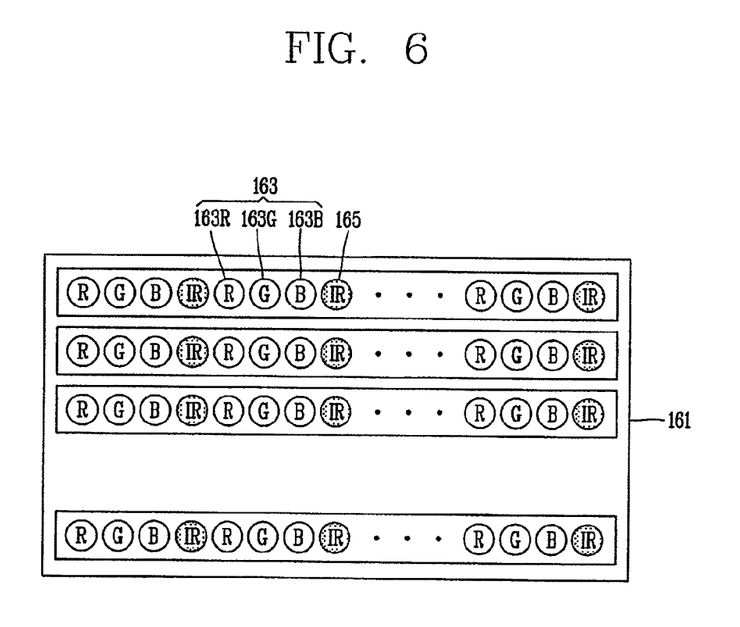
FIG. 6 is a schematic plan view of a back light unit consisting of a plurality of R, G, and B LEDs and IR light sources according to the present invention.

FIG. 6 is a schematic plan view of a back light unit consisting of a plurality of R, G, and B LEDs and IR light sources according to the present invention.

Figure 7:
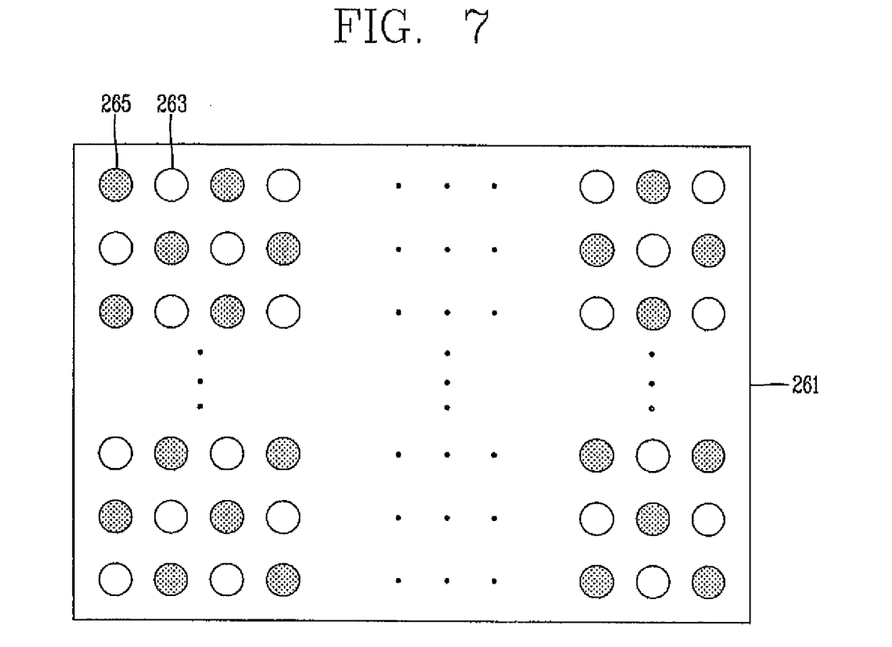
FIG. 7 is a plan view of a back light unit in which LED light sources and IR light sources are adjacent to each other according to another embodiment of the present invention.

FIG. 7 is a plan view of a back light unit in which LED light sources and IR light sources are adjacent to each other according to another embodiment of the present invention.

Figure 8:
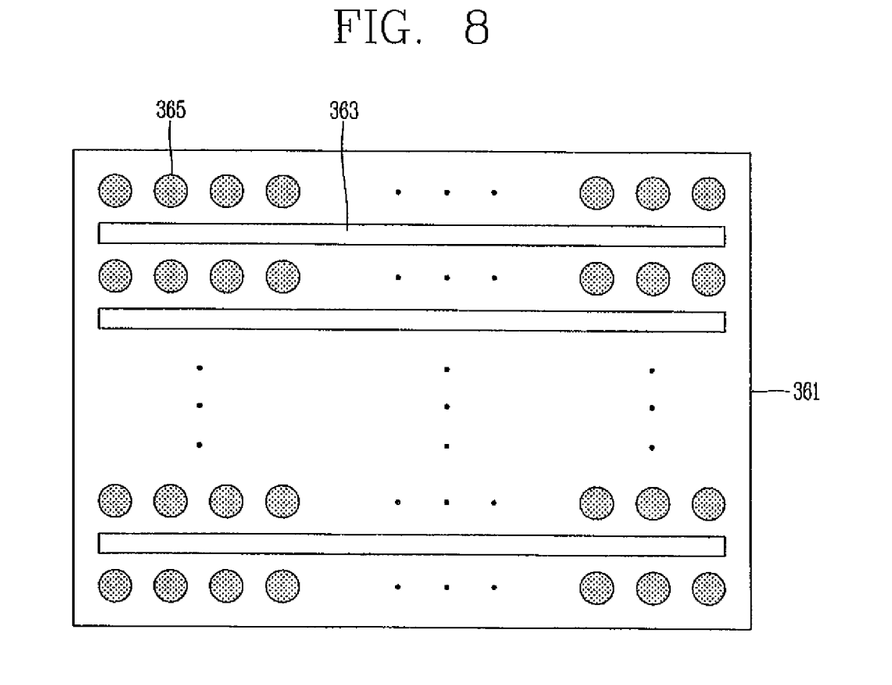
FIG. 8 is a schematic plan view of a back light unit having a structure in which a plurality of IR light sources and cold cathode fluorescent lamps (CCFL) or external electrode fluorescent lamps (EEFL) are provided according to still another embodiment of the present invention.

FIG. 8 is a schematic plan view of a back light unit having a structure in which a plurality of IR light sources and cold cathode fluorescent lamps (CCFL) or external electrode fluorescent lamps (EEFL) are provided according to still another embodiment of the present invention.

As illustrated in FIG. 6, the back light unit according to the present invention includes a plurality of light emitting diode (LED) light sources 163 each consisting of red (R), green (G), and blue (B) LEDs 163R, 163G, and 163B and IR light sources 165 and the LED light sources 163 and the IR light sources 165 are repeatedly arranged in column and row directions in units of the three LED light sources 163 and IR light sources 165.

Here, the red (R), green (G), and blue (B) LEDs 163R, 163G, and 163B and the IR light sources 165 are arranged on a uniform regulation, however, if necessary, can be differently arranged. Here, the materials of the IR light sources 165 such as IR LED or IR electroluminescence (EL) are not limited.

On the other hand, according to another embodiment of the present invention, as illustrated in FIG. 7, one of the plurality of LEDs 263R, 263G, and 263B and IR light sources 265 are alternately and repeatedly arranged in the bottom cover (not shown) of the back light unit 261 in column and row directions. Here, the materials of the IR light sources 265 such as IR LED or IR EL are not limited.

On the other hand, according to still another embodiment of the present invention, as illustrated in FIG. 8, fluorescent lamps 363 formed of CCFLs or EEFLs and the plurality of IR light sources 365 are alternately and repeatedly arranged in the bottom cover (not shown) of the back light unit 361 in a row direction.

Here, the materials of the IR light sources 365 such as IR LED or IR EL are not limited.

In addition, the basic back light to which the IR light sources are added is a fluorescent lamp unlike in a conventional art. However, the structure of the back light is not limited but an RGB LED and a white LED can be used for the back light.

The number of IR light sources can vary in accordance with the intensity of required IR light.

In addition, the arrangement of the IR light sources is not limited but the arrangement and positions of the IR light sources can be controlled in accordance with the brightness, the radiation angle, and the operation characteristics of the IR light sources.

On the other hand, the LCD to which the back light unit having such a structure is applied will be described as follows with reference to FIG. 9.

Figure 9:
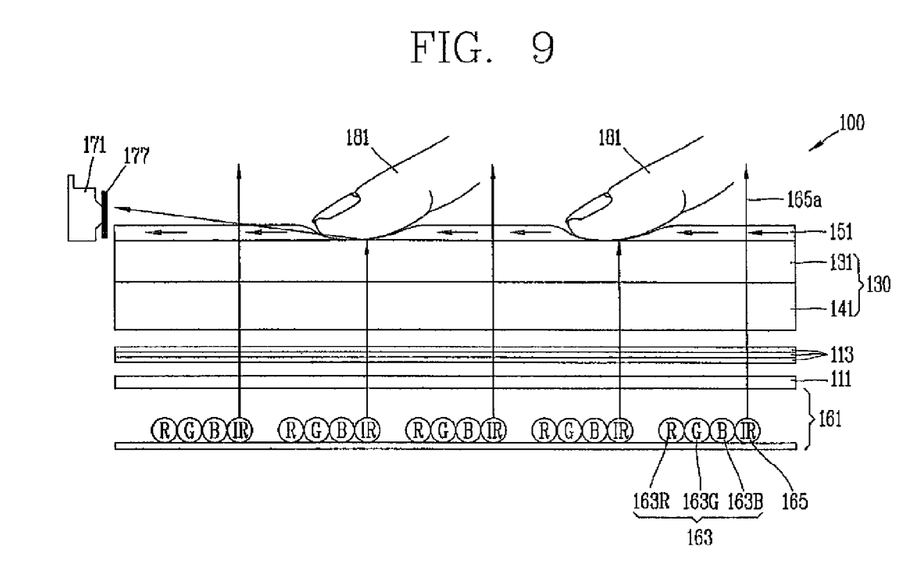
FIG. 9 is a schematic sectional view of an LCD including the back light unit consisting of the plurality of R, G, and B LEDs and IR light sources according to the present invention.

FIG. 9 is a schematic sectional view of an LCD including the back light unit consisting of the plurality of R, G, and B LEDs and IR light sources according to the present invention.

As illustrated in FIG. 9, the LCD to which the back light unit according to the present invention is applied includes a back light unit 161 consisting of the LED light sources 163 each consisting of the plurality of red (R), green (G), and blue (B) LEDs 163R, 163G, and 163B and the IR light sources 165 and a diffusion sheet 111, a prism sheet 113, and an LCD panel 130 provided on the back light unit 161 to secure a desired view angle.

Here, a reflection plate (not shown) for preventing light from leaking is provided under the LED light source 163.

In addition, the LCD panel 130 includes a lower array substrate 141 on which a switching device for driving the LCD panel is formed, a color filter array substrate 131 on which an image is displayed by driving the switching device, and a liquid crystal layer (not shown) provided between the lower array substrate 141 and the color filter array substrate 131 to control the transmittance of light while moving in a certain direction in accordance with an electric field direction.

On the other hand, a touch panel 151 is attached onto the LCD panel 130 so that an LCD to which the touch panel 151 is applied is realized.

At this time, although not shown in the drawing, the touch panel 151 includes an indium tin oxide (ITO) substrate (not shown) attached onto the upper surface of the LCD panel 130 and a position sensor film (not shown) and an ITO film (not shown) attached onto the ITO substrate (not shown) to sense the X and Y position coordinates of an object.

An IR light transmission filter 177 for using only the IR light is provided in a camera 171 provided on the upper side of the LCD 100 having the above structure.

Therefore, the LCD 100 senses touch using a principle in which the image incident on the camera 171 varies as illustrated in FIG. 9. The IR light transmitted from the IR light sources 165 added to the back light unit 161 onto the surface of the LCD 100 is reflected by a touch object 181 to be incident on the camera 171.

Then, only the touch object 181 region is extracted from the entire image so that the touch object 181 region undergoes a signal processing process and that a clear touch sense image is created.

On the other hand, the multi-touch system to which the LCD having the above structure is applied will be described as follows with reference to FIG. 10.

Figure 10:
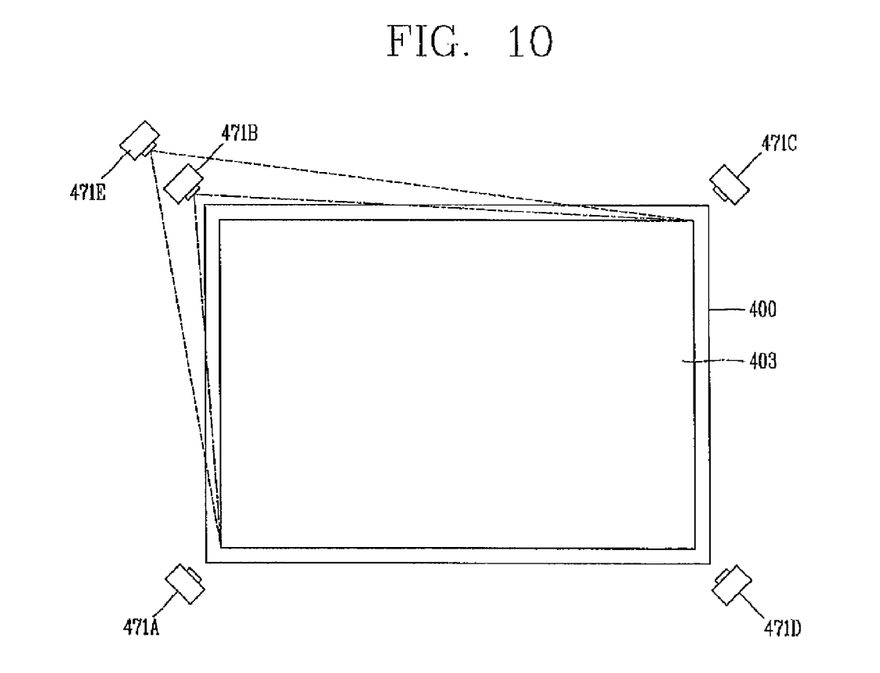
FIG. 10 is a schematic plan view illustrating a multi-touch system using the LCD to which the back light unit according to the present invention is applied according to still another embodiment of the present invention.

FIG. 10 is a schematic plan view illustrating a multi-touch system using the LCD to which the back light unit according to the present invention is applied according to still another embodiment of the present invention.

Figure 11:
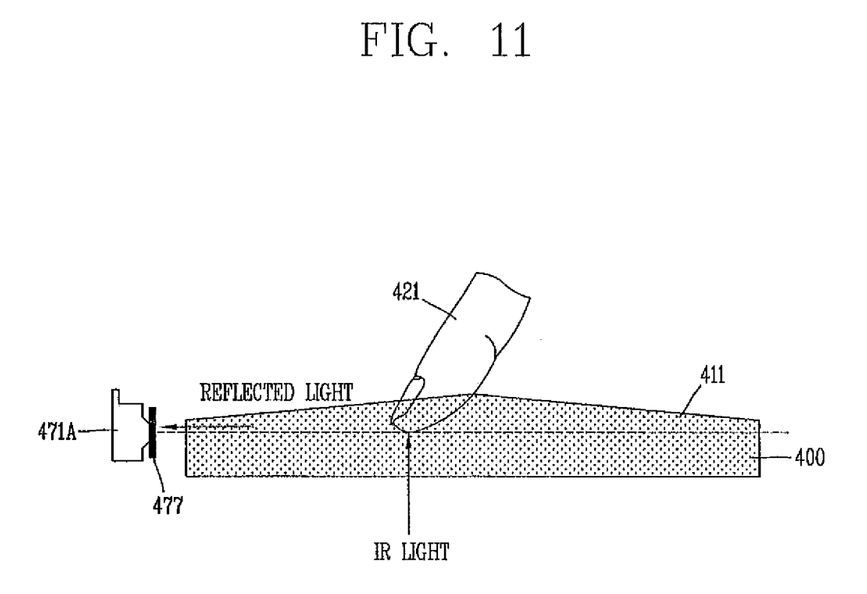
FIG. 11 is a view schematically illustrating the traveling channel of reflected light from the IR light sources of the multi-touch system using the LCD to which the back light unit according to the present invention is applied.

FIG. 11 is a view schematically illustrating the traveling channel of reflected light from the IR light sources of the multi-touch system using the LCD to which the back light unit according to the present invention is applied.

Figure 12:
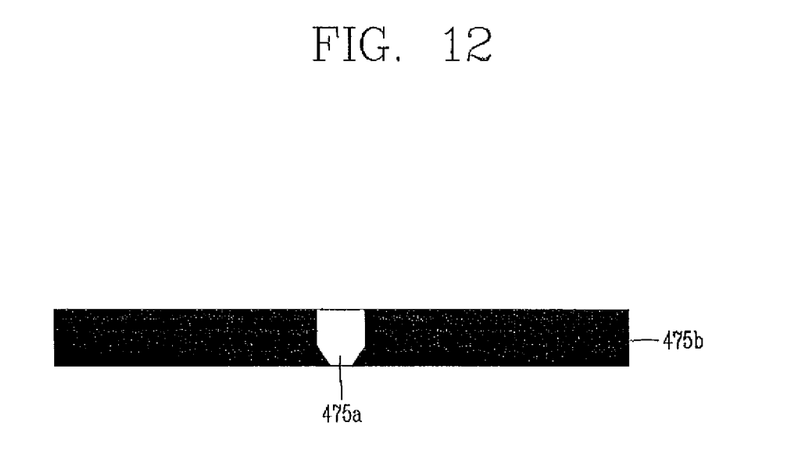
FIG. 12 is a schematic view illustrating a touch point sensing image after the image in a touch surface region is signal processed among camera images in the multi-touch system according to the present invention.

FIG. 12 is a schematic view illustrating a touch point sensing image after the image in a touch surface region is signal processed among camera images in the multi-touch system according to the present invention.

As illustrated in FIG. 10, the multi-touch system to which the LCD according to the present invention is applied includes an LCD 400 to which the touch panel 151 is attached and on whose entire surface an image display region 403 is provided and a plurality of first to fourth cameras 471A, 471B, 471C, and 471D provided at the edges.

Here, the entire surface of the LCD 400 forms IR illumination no less than a certain level by the IR light sources of the back light modules and the number of IR light sources varies in accordance with the required intensity.

In addition, the IR light sources are not limited if the IR light sources do not affect the picture quality observed by naked eyes.

The range of the image incident on the cameras 471A, 471B, 471C, and 471D is determined so that a user can secure the region corresponding to the range in which the user touches the touch surface. In particular, the cameras can photograph all of the ranges of the LCD only when an image angle is close to 90 degrees. However, the image angle is not necessarily fixed.

As illustrated in FIG. 10, like in the relationship between the second camera 471B and a fifth camera 471E, when the fifth camera 471E is remote from the LCD 400, the image angle formed by the camera and a lens can be reduced.

As illustrated in FIG. 11, an IR light transmission filter 477 for using only the IR light is provided in the first camera 471A.

Therefore, the LCD 400 senses touch using a principle in which the image incident on the camera 471A varies as illustrated in FIG. 11.

The IR light transmitted from a back light (not shown) to the surface of the LCD 400 is reflected by a touch object 421 to be incident on the camera 471A.

As illustrated in FIG. 12, only a touch surface 475a region is extracted from the entire image so that the touch surface 475a region undergoes a signal processing process and that a clear touch sense image is created. That is, since the upper and lower images in the entire image of the camera are unnecessary parts that reduce the speed of the system, only a necessary part is extracted. That is, since the IR light incident from the IR light sources is reflected from the touch surface 475a to be incident on the camera 471A, the touch surface 475a is displayed white. Since the IR light is transmitted to the front surface of the LCD and is not incident on the camera 471A in the remaining background 475b, the remaining background 475b is displayed black. However, in the image illustrated in FIG. 12, the light and shade of the background 475b and the light and shade of the touch surface 475a can be reversed in accordance with a method of processing the image.

The LCD to which the IR light sources according to the present invention are applied and the multi-touch system using the same have the following effects.

In the LCD to which the IR light sources according to the present invention are applied and the multi-touch system using the same, since the IR light sources are added to the back light to increase the intensity of the IR light of the LCD and to provide an effective use environment to the system in which an IR light receiving sensor and the cameras are used, the utilization region of the LCD can be increased.

In addition, according to the present invention, although the IR light sources are added to the back light, since the IR is not sensed by human eyes, the picture quality is not affected.

According to the present invention, the display having a multi-touch function can be manufactured using the IR.

Furthermore, according to the present invention, since the IR light sources are attached to the LCD, it is not necessary to realize the sensor system by mounting the IR light sources in the outside like in the conventional art.

In addition, according to the present invention, the mechanical size of the sensor system in which the external IR light sources are used like in the conventional art can be reduced.

The invention being thus described, it will be obvious that the same may be varied in many ways. Such variations are not to be regarded as a departure from the spirit and scope of the invention, and all such modifications as would be obvious to one skilled in the art are intended to be comprised within the scope of the following claims.

What is claimed is:

1. A multi-touch system to which an LCD is applied, comprising:
    the LCD including a back light in which a plurality of lamp light sources and a plurality of IR light sources are repeatedly arranged in column and row directions, an LCD panel provided on the back light to display an image using light incident from the back light, and a touch panel attached onto the LCD panel;
    a plurality of cameras that are provided at upper edges of the LCD and in which IR light incident from the IR light sources provided in the LCD is reflected by a touch object and the reflected IR light is incident to create a touch sense image; and
    an IR light transmission filter provided at the front of each of the cameras, wherein the IR light transmission filter provides only the IR light transmitted from the IR light sources into the cameras,
    wherein the lamp light source is selected from a light emitting diode (LED), electroluminescence (EL), a cold cathode fluorescent lamp (CCFL), and an external electrode fluorescent lamp (EEFL), and
    wherein the LCD senses touch using a principle in which the image incident on the camera varies, the IR light transmitted from the IR light sources of the back light to the surface of the LCD is reflected by the touch object to be incident into the camera through the IR light transmission filter, and only a touch surface region by the touch object is extracted from an entire image so that the touch surface region undergoes a signal processing process and a clear touch sense image is created.

2. The multi-touch system as claimed in claim 1, wherein, when the CCFL or the EEFL is used as the lamp light source, the plurality of IR light sources are repeatedly arranged together with one CCFL or EEFL.

3. The multi-touch system as claimed in claim 1, wherein, when the LED light source is used as the lamp light source, one LED and one IR light source are repeatedly and alternately arranged in column and row directions.

4. The multi-touch system as claimed in claim 1, wherein the LED light sources are repeatedly arranged in column and row directions in units of three R, G, and B LEDs and one IR light source.

5. The multi-touch system as claimed in claim 1, wherein an IR light transmission filter is provided in the LCD panel.

* * * * *